(12) United States Patent
Oda

(10) Patent No.: US 6,222,548 B1
(45) Date of Patent: *Apr. 24, 2001

(54) THREE-DIMENSIONAL IMAGE PROCESSING APPARATUS

(75) Inventor: Mamoru Oda, Noda (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/846,479

(22) Filed: May 1, 1997

(30) Foreign Application Priority Data

May 15, 1996 (JP) .................................. 8-120562

(51) Int. Cl.$^7$ .................................. G06T 15/00
(52) U.S. Cl. .................................. 345/419; 345/502
(58) Field of Search .................................. 345/419, 418, 345/437, 421, 422, 425, 427, 420, 502, 503, 504, 520, 522, 474

(56) References Cited

U.S. PATENT DOCUMENTS

| | | | |
|---|---|---|---|
| 5,148,521 | * 9/1992 | Ebbers et al. | 345/506 |
| 5,159,665 | 10/1992 | Priem et al. . | |
| 5,299,309 | * 3/1994 | Kuo et al. | 345/502 |
| 5,412,762 | * 5/1995 | Kondo | 345/420 |
| 5,421,028 | 5/1995 | Swanson . | |
| 5,444,550 | 8/1995 | Enokida et al. . | |
| 5,473,750 | 12/1995 | Hattori . | |
| 5,511,165 | 4/1996 | Brady et al. . | |
| 5,566,285 | * 10/1996 | Okada | 345/430 |
| 5,581,665 | * 12/1996 | Sugiura et al. | 345/419 |
| 5,682,505 | * 10/1997 | Usami et al. | 345/418 |
| 5,687,304 | * 11/1997 | Kiss | 345/419 |
| 5,687,307 | * 11/1997 | Akisada et al. | 345/437 |
| 5,736,991 | * 4/1998 | Tada | 345/474 |
| 5,751,289 | * 5/1998 | Myers | 345/419 |
| 5,784,070 | * 7/1998 | Furuhashi et al. | 345/419 |
| 5,815,156 | * 9/1998 | Takeuchi | 345/419 |
| 5,821,940 | * 10/1998 | Morgan et al. | 345/420 |
| 5,854,639 | * 12/1998 | Miyoshi | 345/512 |

FOREIGN PATENT DOCUMENTS

| | | |
|---|---|---|
| 0599579 | 6/1994 | (EP) . |
| 0627700 | 12/1994 | (EP) . |

OTHER PUBLICATIONS

Edmund Sun et al.; "High Performance 3–D Graphics Processing"; Proceedings of the 1988 American Control Conference Jun. 15–17, 1988; pp. 1–7.

* cited by examiner

Primary Examiner—Raymond J. Bayerl
Assistant Examiner—Tadesse Hailu

(57) ABSTRACT

An image processing system, including a main CPU, a main storage, a three-dimensional image processor and a CRT for a display unit. The system further includes a system bus that connects the main CPU with the three-dimensional image processor to perform data transfer. In a preferred embodiment, the three-dimensional image processor also includes a command analyzer, a model data accumulating memory, a coordinate transformation processor, a viewing transforming circuit, a texture processing circuit and an image memory and video control circuit. The image processing system of the present invention makes it possible to reduce a load on the main CPU, which shortens data transfer time and thereby improves processing speed of the system.

5 Claims, 7 Drawing Sheets

THREE-DIMENSIONAL IMAGE PROCESSING APPARATUS

BACKGROUND OF THE INVENTION

(1) Field of the Invention

The present invention relates to a three-dimensional image processing apparatus for three-dimensional computer graphics to effect image generation in accordance with pictorial drawing instructions from a main CPU.

(2) Description of the Prior Art

Computer graphics (to be abbreviated as CG hereinbelow) is the technology for producing pictorial representation on a display from a result calculated and processed by a computer, so that it is possible to visualize a virtual world, or that which cannot be seen in the real world because this technology produces images electronically. Hence, CG can be used as a design tool in various industries such as architecture, electrical industry, machine engineering, etc., as well as a representation tool for scientific simulations and structural analysis. Further, since this technique is also used for production of TV programs and TV games, it has become more accessible to the general public. Recently, this has been attracting attention as a basic technique for virtual reality and multimedia.

Since three-dimensional CG handles an enormous amount of processing data, the data is not processed by only the main CPU (central processing unit) in the computer, but the imaging process is also effected by having dedicated hardware, such as a dedicated three-dimensional image processor, to achieve an improved processing speed. FIG. 1 shows a block diagram of a typical conventional three-dimensional image processor. This three-dimensional image processing system includes a main CPU 10 as a control operating unit, a main storage 12, a three-dimensional image processor 30 and a CRT 18 as a display device with a system bus 14 connecting main CPU 10, main storage 12 and three-dimensional image processor 30 to transfer data therebetween.

Three-dimensional image processor 30 includes a viewing transforming circuit 31, a texture processing circuit 32, a shading processing circuit 33, a pixel processing circuit 34 and an image memory and video control circuit 35.

Next, the overall operation of the three-dimensional image processing system will be described. The description is made with reference to FIG. 2 which is a flowchart showing the operation of the main CPU. Main storage 12 stores data for constituting the model and features of an object to be drawn in order to create a three-dimensional image of pictorial representation. This object is divided into polygons such as triangles, rectangles, etc., and for the vertexes constituting each polygon are data-formatted into coordinate values, colors, etc. This is stored as polygonal data in main storage 12.

Main CPU 10 reads out this polygonal data from main storage 12 via system bus 14 to execute the following processing according to software, or a three-dimensional image processing program. Based on the information as to the position of a viewpoint, direction of view and angle of the viewing which are given for drawing the image on the CRT screen, an eye coordinate system is set up by coordinate transformation (Step S21). After the display is cleared (Step S22), the polygonal data, i.e., the model data of an object is transformed into that in the eye coordinate system (Step S23) and subsequently, the texture environment is set up (Step S24). Setting up of the texture environment means the setting of two-dimensional images which are to be applied to the polygons. The polygonal data (including the texture data) thus transformed and designated is transferred to three-dimensional image processor 30 via system bus 14 (Step S25). At Step S26, it is checked if the polygonal data has been all transferred, and if the transfer has not yet ended, the operation is returned to Step S25, whereas if it is finished, the transmission will be stopped at Step S27. Then, main CPU 10 instructs three-dimensional image processor 30 to start picture drawing (Step S28).

The polygonal data sent to three-dimensional image processor 30 is converted into the two-dimensional coordinate data on the image frame and the data is subjected to various processing such as clipping, hidden-line/hidden-surface treatments. The data further undergoes an ambient lighting process for determining a model of an ambient light source and identifying its position. Next, images representing textures and patterns such as wood grain, etc. are mapped onto the polygons by means of texture processing circuit 32. In shading processing circuit 33, the surface expression of objects is created. Specifically, this process involves interpolation between neighboring pieces of color data at each vertex of polygons and creation of shadows on the surfaces of the polygons. Subsequently, pixel processing circuit 34 performs depth comparison in which when two or more objects overlap one another, their z-coordinate values (the z-axis is assumed to be the view direction) are compared so as to select the pixels which have been determined to be less distant. Further, a blending process for representing the transparency of an object is also performed. This image signal is once stored into the image memory and then displayed on the CRT by image memory and video control circuit 35.

Main CPU 10 checks if the program has been completed at Step S29, and if not, the operation is returned to Step S22, whereas if it is done, the operation is stopped.

In the above conventional processing scheme, in order to depict an object, the model data is converted into that in the eye coordinate system associated with the position of a viewpoint, the direction of view and the like. The thus converted data is transferred via system bus 14 to three-dimensional image processor 30 so as to be formed into the image. However, in accordance with this scheme, whenever the position of eye is changed, main CPU 10 has to effect a coordinate transformation and the converted model data must be transferred to three-dimensional image processor 30. In this way, since the model data constituting an object within the field of view is transferred to three-dimensional image processor 30 every time the position of viewpoint as well as the direction of view, etc. is changed, the load on system bus 14 with respect to the data transfer increases, lowering the processing rate of the whole system. Particularly, when the conventional system is applied to a virtual reality system in which the position of viewpoint, the direction of view and the like need to be changed very often, not only does the processing rate drop due to the aforementioned transfer load but also the processing other than that of the CG process cannot be executed.

For example, the transmission of one word (32 bits) through the system bus needs 30 nanoseconds. Since 49 words are need for each of the polygons, if polygonal data of ten thousand triangles is transferred, it takes 1470 nanoseconds (10,000×30 ns=1,470 ns). Every time the position of viewpoint and/or the direction of view is changed, the above-mentioned time is needed only for data transfer, and main CPU 10 needs additional time for effecting coordinate transformations etc. Accordingly, as the amount of data to be transferred increases, most of the capacity of the main CPU and the system bus is occupied by the CG processing.

SUMMARY OF THE INVENTION

It is therefore an object of the present invention to provide a three-dimensional image processing apparatus in which the drawing speed of a three-dimensional image and the processing capacity of the system are improved by reducing the amount of information transferred from a main CPU.

The present invention has been devised in order to attain the above object and the gist of the invention is as follows:

In accordance with the first aspect of the invention, a three-dimensional image processing apparatus includes:

- a model data storing means for storing model data of an object to be image processed;
- a coordinate transforming means for transforming the model data read out from the storing means into that in a coordinate system for generating a three-dimensional image; and
- an image generating means for generating a three-dimensional image based on the transformed coordinate system, and is characterized in that the model data is once stored into the model data storing means, and subsequently, the image processing is performed based on a given piece of information for coordinate transformation.

Next, in accordance with the second aspect of the invention, a three-dimensional image processing apparatus having the above first feature, further includes:

- an information analyzing means for separating a given piece of information into model data and information for coordinate transformation, wherein model data is sent out to the model data storing means while information for coordinate transformation is sent out to the coordinate transforming means.

In accordance with the third aspect of the invention, a three-dimensional image processing apparatus having the above first feature, further includes an auxiliary model data storing means which imparts model data to the model data storing means, as required.

Further, in accordance with the fourth aspect of the invention, a three-dimensional image processing apparatus having the above second feature, further includes an auxiliary model data storing means which imparts model data to the model data storing means, as required.

Next, in accordance with the fifth aspect of the invention, a three-dimensional image processing apparatus having the above third feature is constructed such that the model data storing means has a multiplex structure so that it is composed of a storage portion for the model data to be used for coordinate transformation and a storage portion for the model data to be imparted from the auxiliary model data storing means.

In accordance with the sixth aspect of the invention, a three-dimensional image processing apparatus having the above fourth feature is constructed such that the model data storing means has a multiplex structure so that it is composed of a storage portion for the model data to be used for coordinate transformation and a storage portion for the model data to be imparted from the auxiliary model data storing means.

Next, in accordance with the seventh aspect of the invention, a three-dimensional image processing apparatus having the above third feature, is constructed such that the auxiliary model data storing means is adapted to receive model data from outside via a communications line.

Further, in accordance with the eighth aspect of the invention, a three-dimensional image processing apparatus having the above fourth feature, is constructed such that the auxiliary model data storing means is adapted to receive model data from outside via a communications line.

Still more, in accordance with the ninth aspect of the invention, a three-dimensional image processing apparatus having the above fifth feature, is constructed such that the auxiliary model data storing means is adapted to receive model data from outside via a communications line.

Finally, in accordance with the tenth aspect of the invention, a three-dimensional image processing apparatus having the above sixth feature, is constructed such that the auxiliary model data storing means is adapted to receive model data from outside via a communications line.

According to the invention, since it is possible to generate a three-dimensional image by, first, storing a piece of model data into the model data storing means and subsequently inputting only the information for coordinate transformation, it is possible to markedly reduce the transferred amount of data to the three-dimensional image processor. Further, since it is no longer necessary for the main CPU in the three-dimensional image processing system to perform coordinate transformations of model data as done in the prior art, it is possible to markedly reduce the burden of the main CPU.

Further, the addition of an information analyzing means for separating given information into model data and information for coordinate transformation enables separation of the information transferred through a single bus into model data and information for coordinate transformation in the three-dimensional image processor. Hence, the main CPU should send out only the given information, thereby realizing a reduction in its burden.

Further, if an auxiliary model data storing means is provided, it becomes possible to handle a much higher amount of model data, making it possible to perform higher capacity image processing. Moreover, by providing a model data storing means in a multiplex structure, it is possible to operate the system even while data from the auxiliary model data storing means is being transferred to the model data storing means. When a communicating function-equipped model data storing means is added to the auxiliary model data storing means, it become possible to exchange data with external systems.

DESCRIPTION OF THE PREFERRED EMBODIMENTS

The embodiments of the present invention will hereinafter be described with reference to the accompanying drawings.

(The 1st Embodiment)

Figure 1:
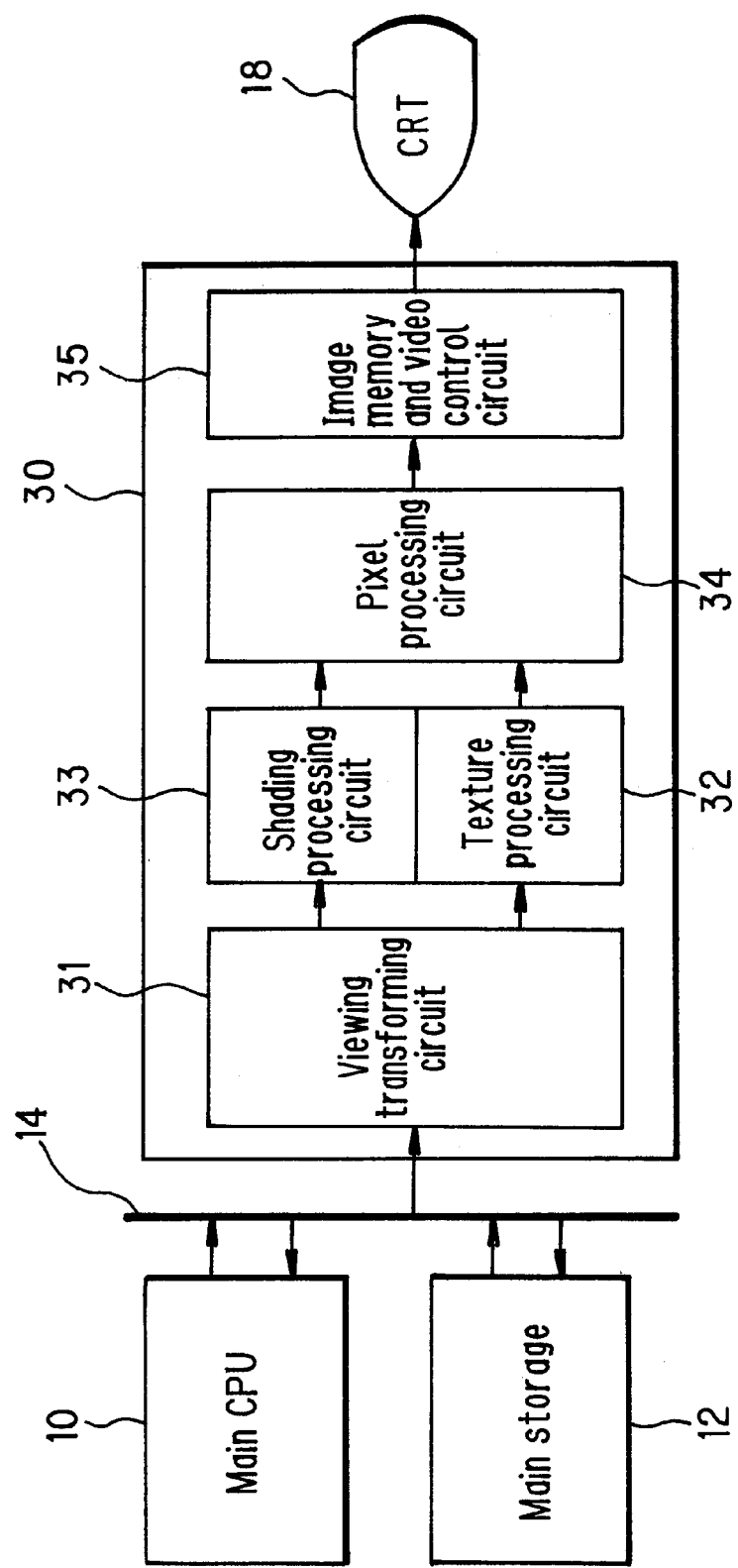
FIG. 1 is a block diagram showing a system in which a conventional typical three-dimensional image processing is used.
Figure 2:
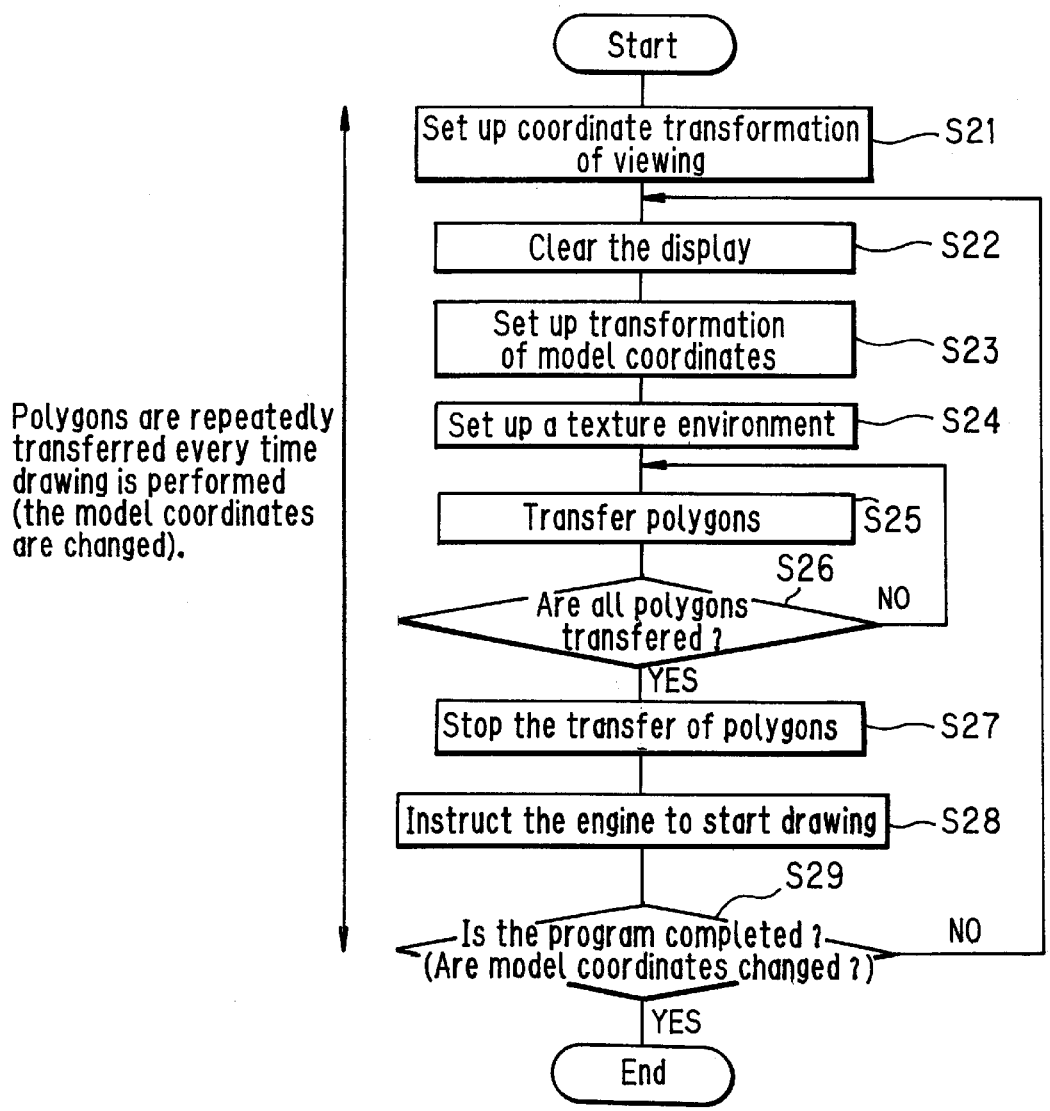
FIG. 2 is a flowchart showing the operation of a main CPU.
Figure 3:
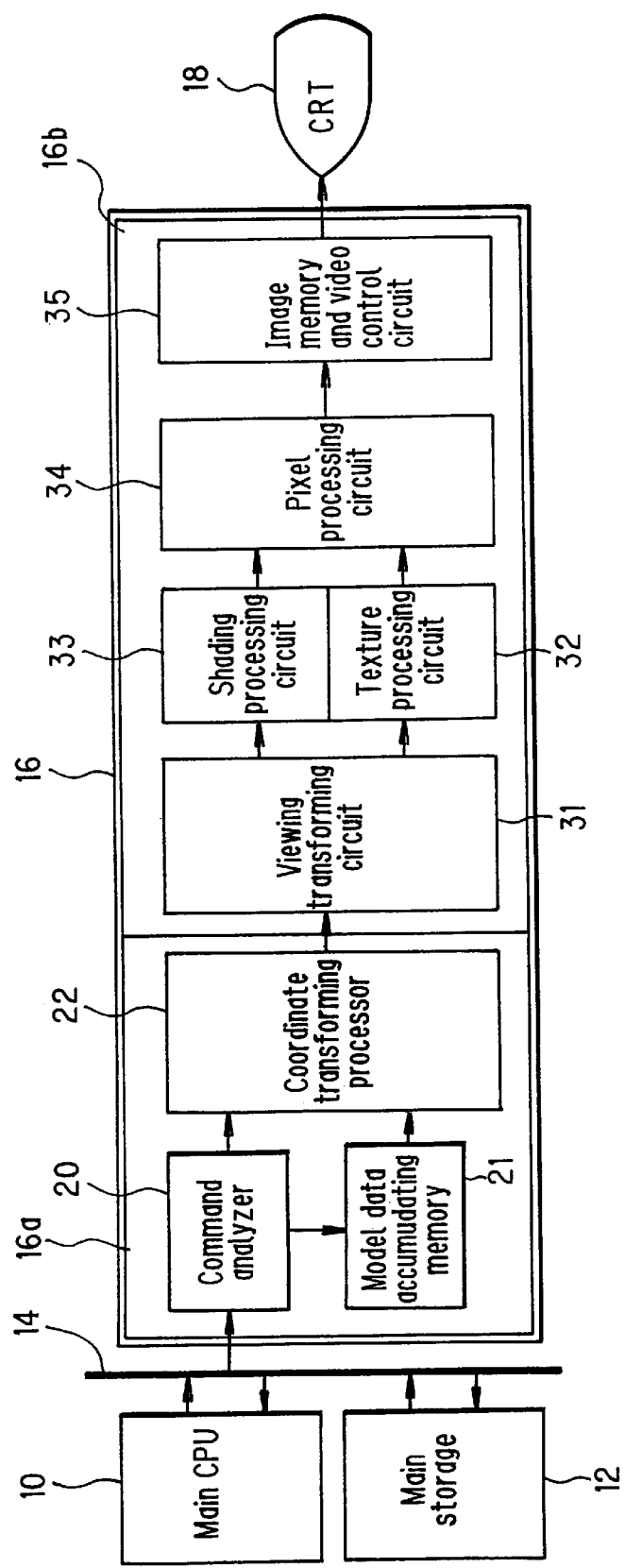
FIG. 3 is a block diagram showing a system according to the first embodiment in which a three-dimensional image processing apparatus of the invention is used.

FIG. 3 is a block diagram showing essential components of a system according to the first embodiment of a three-dimensional image processing apparatus of the invention. This three-dimensional image processing system has a basic configuration substantially similar to that of the prior art. Therefore, the same reference numerals are allotted to the corresponding components without detailed description. The characteristic of the invention resides in that a three-dimensional image processor 16 is composed of a coordinate transforming section 16a having a command analyzer 20, a model data accumulating memory 21, a coordinate transforming processor 22, and an image generating section 16b having the same configuration as in three-dimensional image processor 30 of the prior art. Information from main CPU 10 involving two kinds, i.e., model data and information for coordinate transformation, is inputted through system bus 14 into command analyzer 20 where it is separated into model data and information for coordinate transformation. Model data is stored into model data accumulating memory 21, whereas information for coordinate transformation is inputted into coordinate transforming processor 22. Coordinate transforming processor 22 reads out the model data from model data accumulating memory 21, and this is subjected to a coordinate transforming process based on the information for coordinate transformation and is outputted to image generating section 16b. Image generating section 16b performs the same image processing as described in the prior art. Here, the model data (polygonal data) is comprised of polygons representing an object to be image processed, i.e., coordinate values of their vertexes, colors of the vertexes, texture coordinate values, information of the directions of the normals of the polygons. The information for coordinate transformation is comprised of the position of viewpoint, the direction of view and the angle of the viewing.

Figure 4:
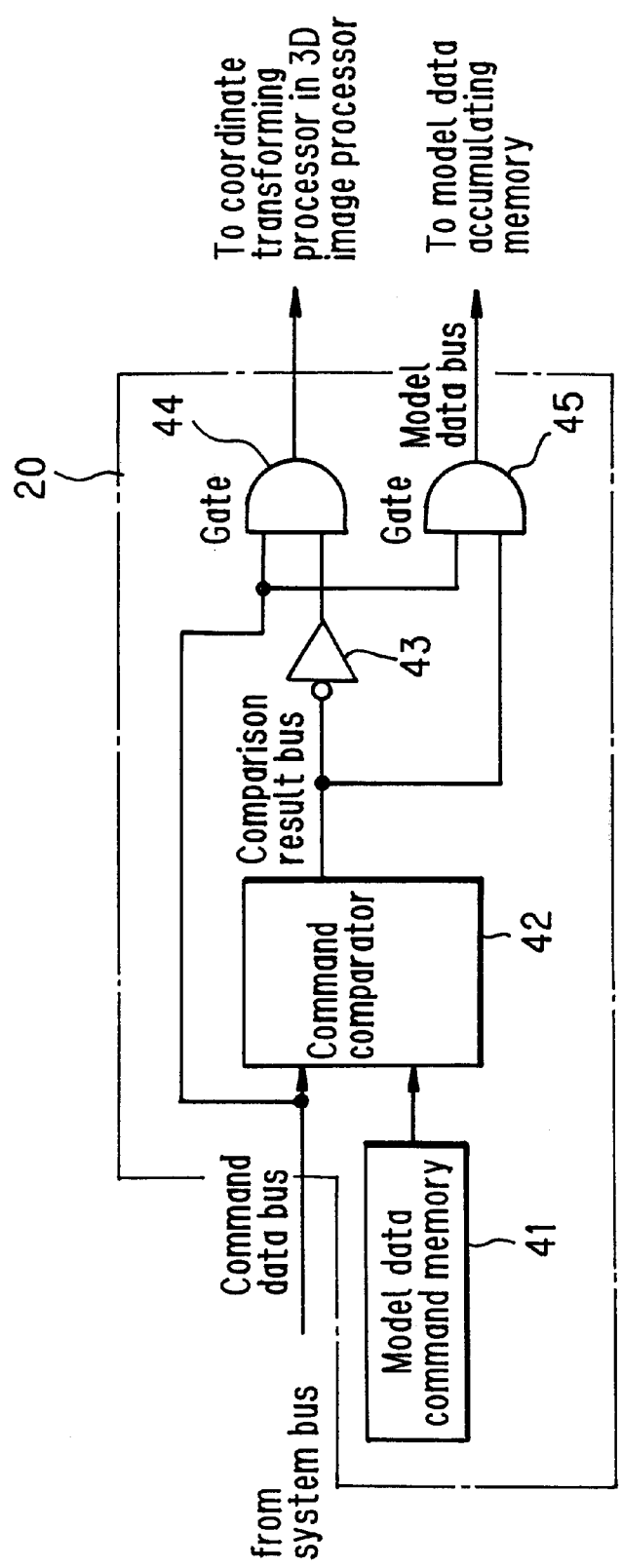
FIG. 4 is a block diagram showing an example of a command analyzer.

FIG. 4 is a block diagram showing an example of the command analyzer. Command analyzer 20 includes a model data command memory 41, command comparator 42, an inverter 43 and gates 44 and 45. Model data command memory 41 has previously stored definition commands with respect to models and data formats. Command comparator 42, when receiving a command and data through the command data bus, compares them with the definition commands and data formats. If the comparison shows agreement, the input signal is sent out as it is, and if it shows disagreement, the input is inverted and outputted. At gate 45, when the comparison result and the signal transmitted through the command data bus show agreement, it is sent out to the model data accumulating memory. Gate 44 compares the signal of the comparison result inverted at inverter 43, with the signal from the command data bus, and outputs the signal to coordinate transforming processor 22 if it shows agreement.

Figure 5:
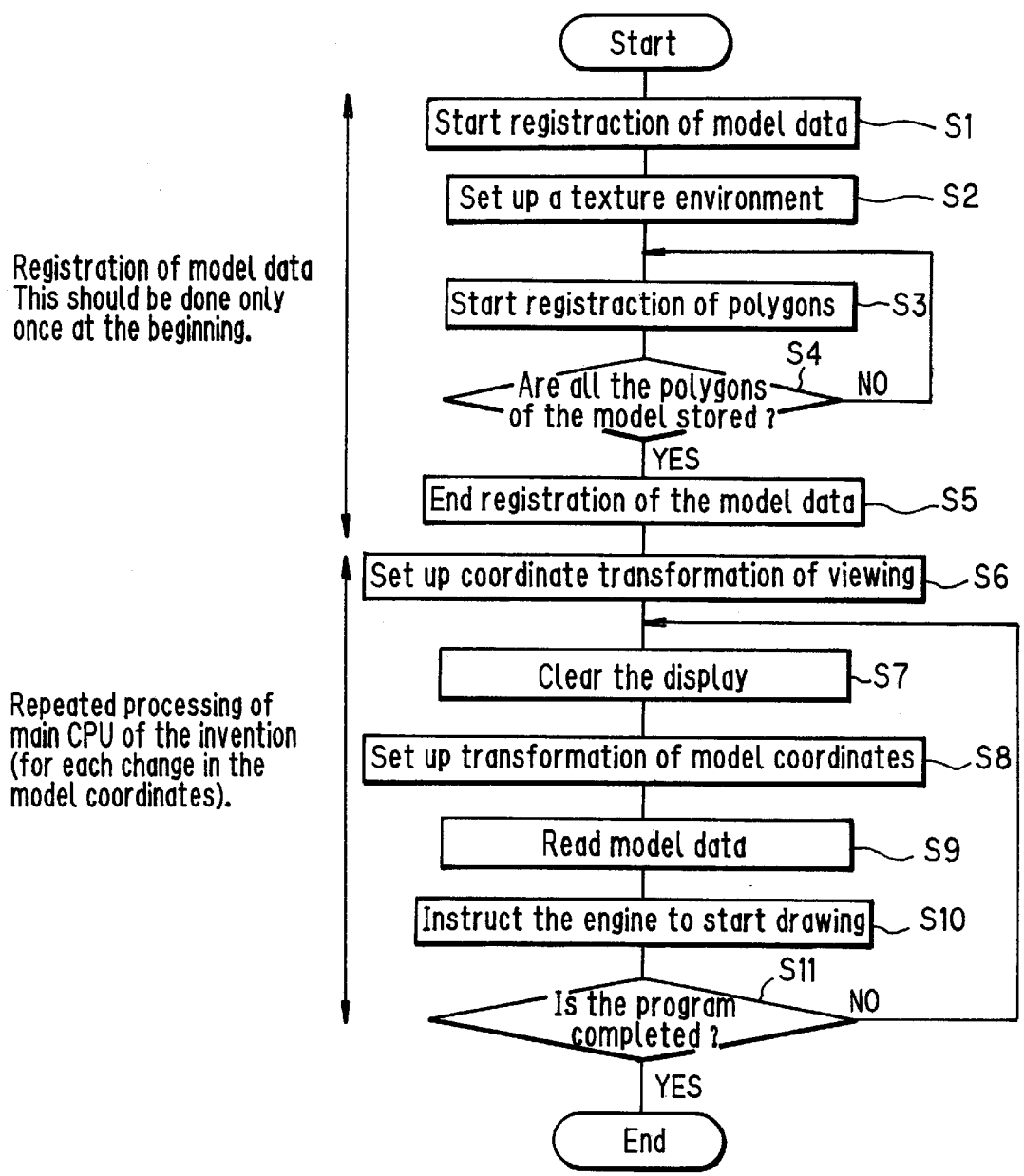
FIG. 5 is a flow chart showing the operation of a main CPU of the three-dimensional image processing system.

Next, the operation of this three-dimensional image processing system will be described in detail focusing on the processing of the main CPU. FIG. 5 is a flowchart showing the operation of the main CPU. First, the CPU starts to perform a registration process of model data (Step S1). Once this process is completed, this process will not be needed again except in the case where the model data itself is to be changed. Then, a texture environment is set up (Step S2), and subsequently, polygonal data starts to be registered (Step S3). Main CPU 10 reads out the polygonal data from main storage 12 via system bus 14 and sends it out to three-dimensional image processor 16 via system bus 14. The data is inputted to command analyzer 20 via the command data bus. As shown in FIG. 4, command comparator 42 compares the polygonal data with the model definition commands and data formats stored in model data command memory 41. If some of the data coincide thereto, those pieces of data are outputted as they are and sent out through gate 45 to be stored into model data accumulating memory 21. Since the output signal from command comparator 42 is inverted before gate 44, this will show disagreement with the signal on the command data bus, therefore will not be outputted.

In this way, is checked to ensure if all the polygonal data has been stored into model data accumulating memory 21 (Step S4). If not, the operation returns to Step S3 to continue the storage operation of polygonal data. When all the polygonal data has been stored, the registration of the model data is ended at Step S5.

Next, main CPU 10 gives an executing command for three-dimensional CG processing and image processing is performed. Specifically, main CPU 10 transfers information for coordinate transformation (the position of viewpoint, direction of view and angle of the viewing) to three-dimensional image processor 16 via system bus 14. As shown in FIG. 4, in command analyzer 20, the data is compared to the information in the model data command memory, the information for coordinate transformation which is not the model data is inverted and outputted. Since the signal is inverted at inverter 43, the signal coincides with the signal on the command data bus, hence being outputted through gate 44 to coordinate transforming processor 22. Since the signal outputted from command comparator 42 does not match the signal on the command data bus, this will never be outputted from gate 45.

Coordinate transforming processor 22 sets up transformation of a viewing coordinate system based on the information for coordinate transformation (Step S6). Then, the display unit, i.e., CRT 18, is once cleared (Step S7).

Coordinate transforming processor 22 reads out the polygonal data stored in model data accumulating memory 21 so that the data can be transformed into that in the designated viewing coordinate system (Step S8). The polygonal data thus converted into the viewing coordinate system is sent out to image generating section 16b (Step S9). The image generating section starts to perform similar processing to that described in the prior art (Step S10). Main CPU 10 checks at Step S11, whether the program has been completed. If not, the operation is returned to Step S7, whereas if it is done, the operation is stopped.

In this way, only when main CPU 10, first stores the model data into model data accumulating memory 21 and then inputs the information for coordinate transformation to three-dimensional image processor 16, is it possible to generate a three-dimensional image. Therefore, it is possible to markedly reduce the amount of data transferred through system bus 14, thereby shortening the data transfer time and sharply improving the processing speed. This reduction in the amount of transferred data can be used for the data transfer for other processing. Further, it is no more necessary for main CPU 10 to perform coordinate transformations of the model data as done in the prior art, thus it is possible to markedly reduce the burden of main CPU 10, producing a margin for other processing, and enabling the CPU to be used efficiently. In this way, this method is remarkably effective for multimedia which needs to effect various processes in parallel.

Further, the inclusion of command analyzer 20 for separating given information into model data and information for coordinate transformation, enables discrimination and separation of the transmitted information into model data and information for coordinate transformation in the three-dimensional image processor 16. Hence, main CPU 10 should merely send out the two kinds of data to three-dimensional image processor 16 via system data bus 14, realizing a reduction in its burden.

(The 2nd Embodiment)

Figure 6:
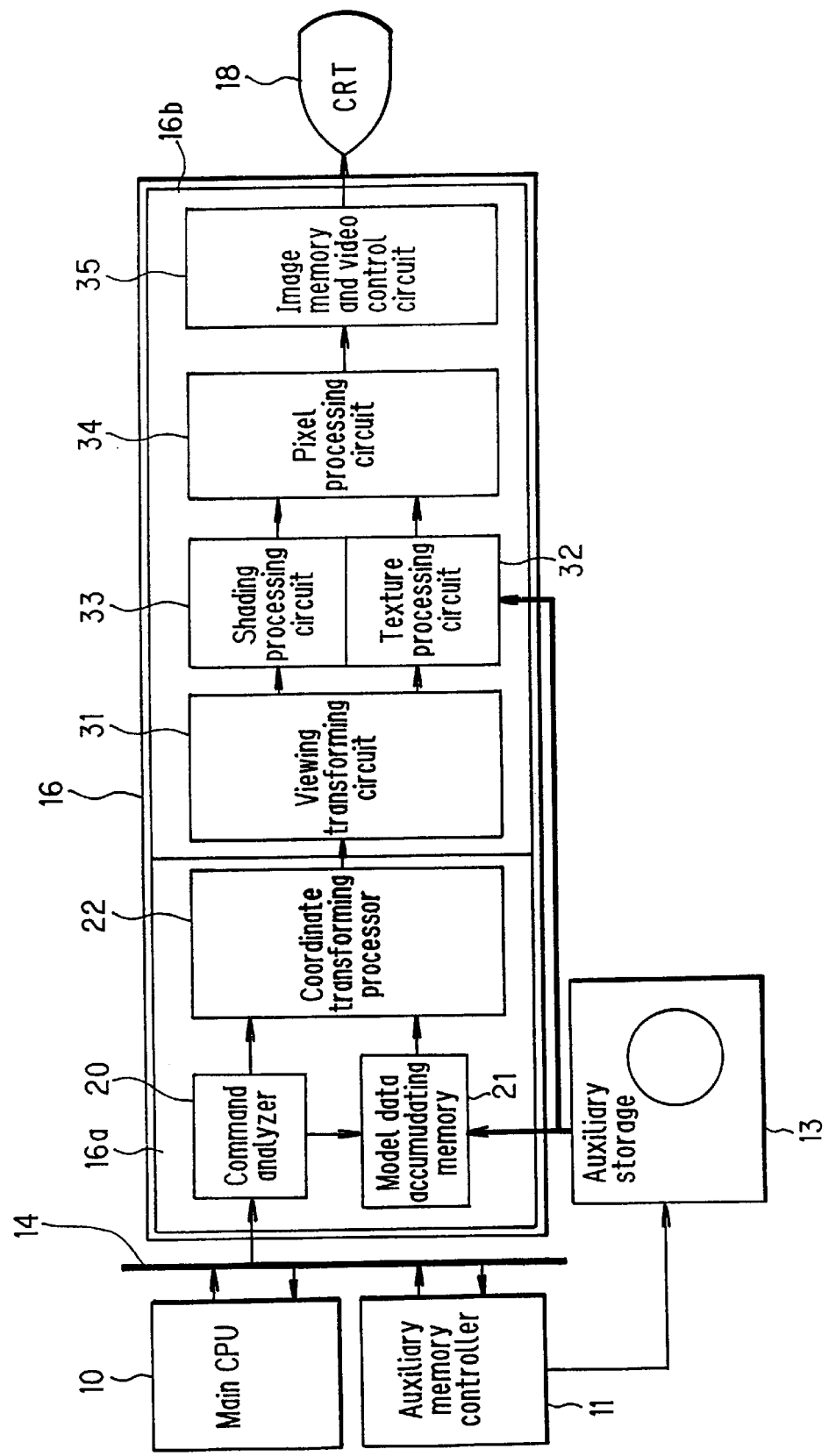
FIG. 6 is a block diagram showing a system according to the second embodiment in which a three-dimensional image processing apparatus of the invention is used.

FIG. 6 is a block diagram showing a system according to the second embodiment in which a three-dimensional image processing apparatus of the invention is used. The characteristic of the invention resides in that it includes an auxiliary memory controller 11 and an auxiliary storage 13. No main storage 12 in the first embodiment stated above is used. Auxiliary storage 13 can be considered to have a mass storage capacity, such as a magneto-optical disc, CD-ROM, ROM cassette, etc., and stores polygonal data and texture data. Main CPU 10 controls auxiliary storage 13 through auxiliary memory controller 11.

When there is a huge amount of polygonal data and texture data, it is impossible in some cases to store it all into the model data accumulating memory. In this case, all the data has been stored previously into auxiliary storage 13. Main CPU 10 transfers the polygonal data from auxiliary storage 13 to model data accumulating memory 21, as required. This function allows the system to handle pieces of model data which are not limited by the capacity of model data accumulating memory 21.

A problem may occur in that the system cannot be used during the transfer from auxiliary storage 13 to model data accumulating memory 21, but this problem can be solved by providing model data accumulating memory 21 in a multiplex structure. In other words, a plurality of model data accumulating memories 21 are provided, and model data is transferred from auxiliary storage 13 to a free model data accumulating memory 21. Texture data which is required with model data is transferred from auxiliary storage 13 to the memory in texture processing circuit 32.

(The 3rd Embodiment)

Figure 7:
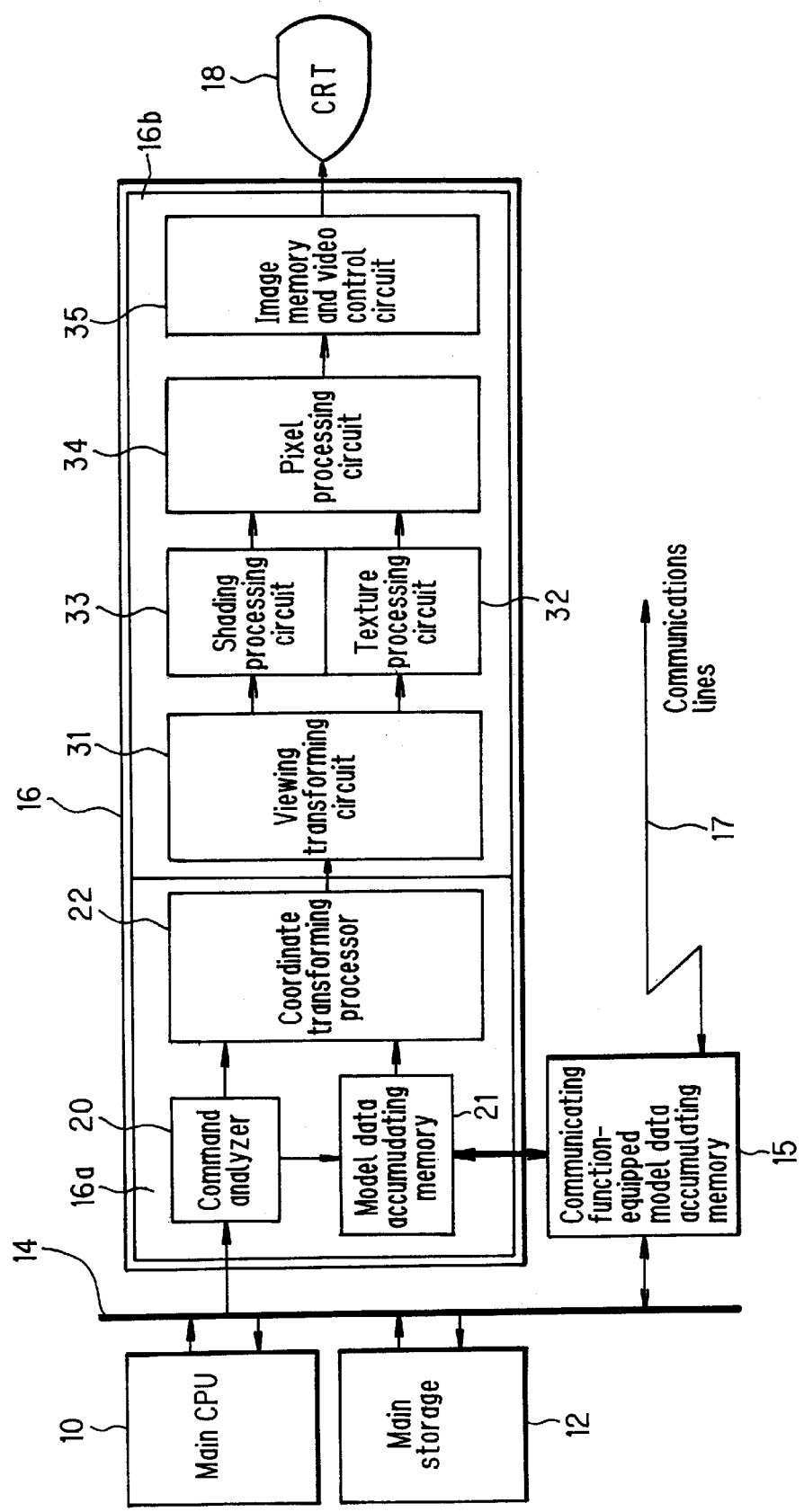
FIG. 7 is a block diagram showing a system according to the third embodiment in which a three-dimensional image processing apparatus of the invention is used.

FIG. 7 is a block diagram showing a system according to the third embodiment in which a three-dimensional image processing of the invention is used. This embodiment is the one in which a communicating function-equipped model data accumulating memory 15 is connected to model data accumulating memory 21 in the mode of the first embodiment. Main CPU 10 gives commands to communicating function-equipped model data accumulating memory 15 via system bus 14. A communications line 17 is connected to communicating function-equipped model data accumulating memory 15 so as to transfer a data transfer request for model data to an external system. The external system which has received the data transfer request for model data, transmits the requested model data. Communicating function-equipped model data accumulating memory 15 receives the transmitted model data through communications line 17 and stores it. The accumulated model data is transferred to model data accumulating memory 21, thus the data is image processed by the same operation as in the first embodiment.

Since this system receives model data through the communications line so as to perform three-dimensional drawing based on the received model data, even if the system does not have the model data which is retained in the remote system, it becomes possible to receive the model data retained in the remote station by transmitting a request for model data to the remote system. Further, if the remote station has the same system, it is possible to display three-dimensional images from the remote station by mutual transmission and reception of model data, thus forming an efficient multimedia means.

As described heretofore, according to the invention, since it is possible to generate a three-dimensional image by once storing a piece of model data into the model data storing means, and subsequently inputting only the information for coordinate transformation, it is possible to markedly reduce the transferred amount of data, thus making it possible to shorten the data transfer time and achieve an improved processing speed. This reduction can be used for the data transfer for other processing. Further, it is no longer necessary for the main CPU to perform coordinate transformations of model data, as done in the prior art, thus to markedly reducing the burden of the main CPU. This allows a wider margin for other processing, and enabling the CPU to be used efficiently. This method is remarkably effective for multimedia which needs to effect various processes in parallel.

Further, the inclusion of a command analyzer for separating given information into model data and information for coordinate transformation enables separation of the transferred information into model data and information for coordinate transformation in the three-dimensional image processor. Hence, the main CPU only send, out the two kinds of data to the three-dimensional image processor via the system data bus, thereby realizing a reduction in its burden.

Further, if an auxiliary model data storing means is provided, it is possible to handle a much higher amount of model data, enabling the system to handle pieces of model data without limiting the capacity of the model data storing means. Moreover, by providing a model data storing means in a multiplex structure, it is possible to eliminate the system problem of inaccessibility during the data transfer from the auxiliary model data storing means to the model data storing means.

Finally, when a communicating function-equipped model data storing means is provided, the system can receive model data through the communications line and perform three-dimensional drawing based on the received model data. Therefore, even if the system does not contain the model data it is possible to receive model data retained in a remote station by transmitting a request for model data to the remote system. Further, if the remote station has the same system, it is possible to display three-dimensional images from the remote station by mutual transmission and reception of model data, thus forming an efficient multimedia means.

What is claimed is:

1. A three-dimensional image processing system for drawing predetermined three-dimensional images by utilizing model data stored in an external storing apparatus comprising:
- a model data accumulating memory for temporarily storing, before drawing, three-dimensional model data of an object to be drawn from model data stored in said external storing apparatus;
- a coordinate transforming processor which, based on coordinate transformation information provided by a CPU, reads out the model data stored in said model data accumulating memory and transforms it into a viewing coordinate system; and
- an image generating section for generating three-dimensional display images by transforming the model data in said viewing coordinate system into two-dimensional coordinates on a display;
- wherein said model data is polygonal data including polygons representing an object to be drawn and coordinate values and colors of the vertices of the polygons.

2. A three-dimensional image processing system according to claim 1, wherein said coordinate transformation information is command data to instruct view position and view direction for the object to be drawn.

3. A three-dimensional image processing system according to claim 1, further comprising a command analyzer for analzing whether data provided from said CPU is is model data or coordinate transformation information, wherein if the data is found to be model data, it is output to said model data accumulating memory, while if the data is found to be coordinate transformation information, it is output to said coordinate transforming processor.

4. A three dimensional image processing system according to claim 1, wherein said model data accumulating memory accumulates said model data by receiving the model data from an external system via a communication line.

5. A three-dimensional image processing system according to claim 1, wherein the external storing apparatus and model data accumulating memory are disposed separately from one another via a system bus.

* * * * *